(12) United States Patent
Alden

(10) Patent No.: US 8,485,450 B2
(45) Date of Patent: Jul. 16, 2013

(54) PHOTON SENSOR USER MANIPULATED TOUCH INTERFACE

(76) Inventor: Ray M. Alden, Raleigh, NC (US)

( * ) Notice: Subject to any disclaimer, the term of this patent is extended or adjusted under 35 U.S.C. 154(b) by 1721 days.

(21) Appl. No.: 11/507,189

(22) Filed: Aug. 21, 2006

(65) Prior Publication Data
US 2007/0057793 A1 Mar. 15, 2007

Related U.S. Application Data

(63) Continuation-in-part of application No. 11/224,163, filed on Sep. 12, 2005, now Pat. No. 7,900,844, and a continuation-in-part of application No. 11/369,491, filed on Mar. 7, 2006, now Pat. No. 7,570,166, and a continuation-in-part of application No. 11/376,799, filed on Mar. 16, 2006, now abandoned, and a continuation-in-part of application No. 11/482,216, filed on Jul. 7, 2006, now abandoned.

(60) Provisional application No. 60/759,084, filed on Dec. 12, 2005.

(51) Int. Cl.
*G06F 19/00* (2011.01)
(52) U.S. Cl.
USPC .......................................... 235/493; 235/375
(58) Field of Classification Search
USPC .................................. 235/375, 380, 387, 392
See application file for complete search history.

(56) References Cited

U.S. PATENT DOCUMENTS

| | | | | |
|---|---|---|---|---|
| 5,396,290 A | * | 3/1995 | Kannegundla et al. | 348/312 |
| 5,585,787 A | * | 12/1996 | Wallerstein | 340/5.42 |
| 5,881,169 A | * | 3/1999 | Henry, Jr. | 382/187 |
| 2004/0124248 A1 | * | 7/2004 | Selker | 235/492 |
| 2007/0139183 A1 | * | 6/2007 | Kates | 340/521 |
| 2008/0223428 A1 | * | 9/2008 | Zeira | 136/244 |

* cited by examiner

*Primary Examiner* — Daniel St Cyr

(57) ABSTRACT

The invention described herein represents a significant advancement in systems that enable a user to control systems and input data into a very wide range of systems. User interface devices that comprise an array of input devices such as buttons on a remote control, keys on a computer keyboard, touch screens, and a computer mouse. Such devices comprise an array of contacts that can be used to capture a user's inputs and communicate them wirelessly using passive RFID apparatuses and processes. Contacts can be positioned in physical proximity to graphics or alphanumeric characters and this proximity can be stored in memory such that a user altering a specific contact status represents specific data to a controlled system or memory. Also, the sequence or change or direction of changes in contacts can be used to control systems or processes in predetermined ways. Remote controls, computer keyboards, a computer mouse, touch screens and pads created with the present contact array invention need not use complex circuits and do not require batteries to operate wirelessly.

20 Claims, 11 Drawing Sheets

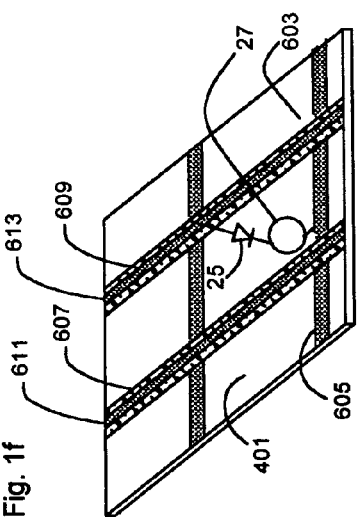
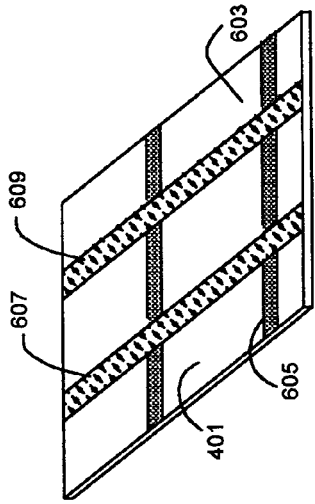
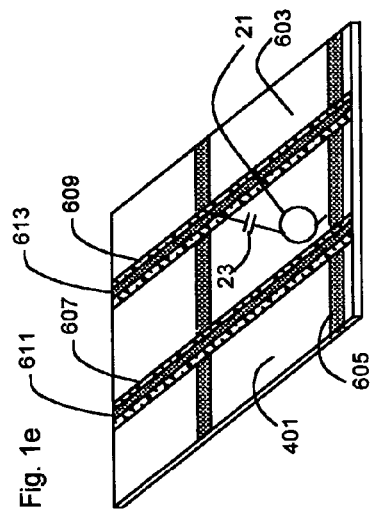
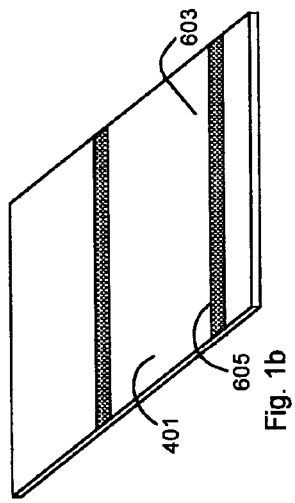
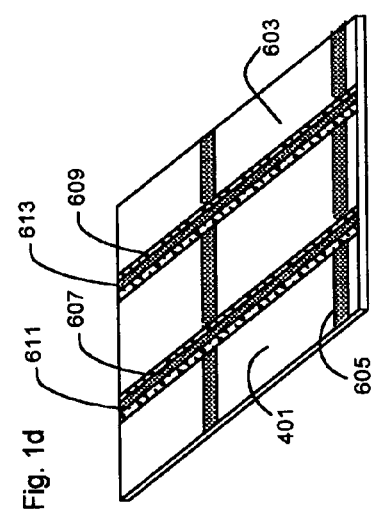
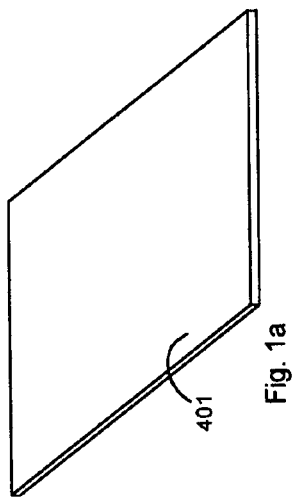

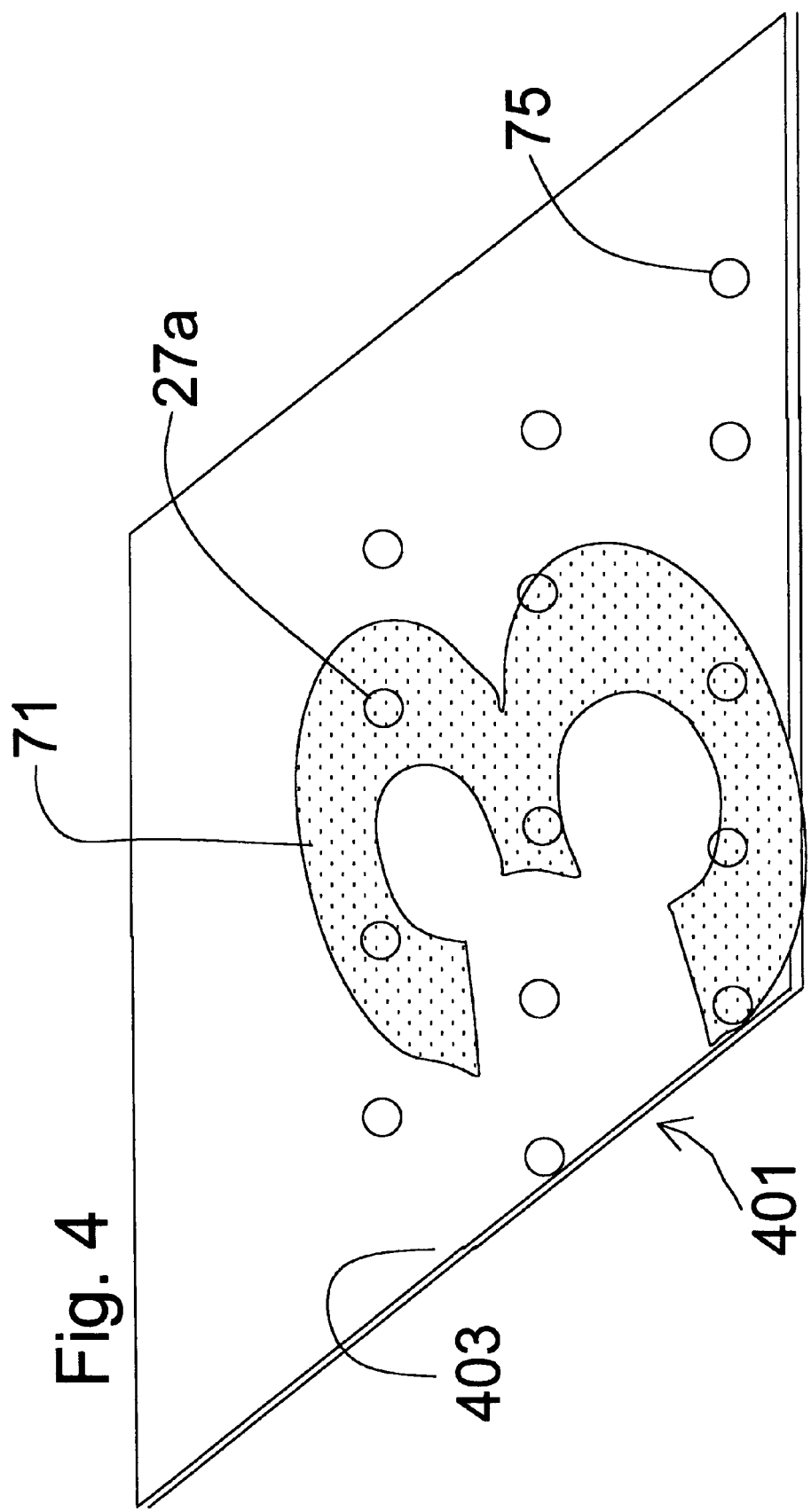

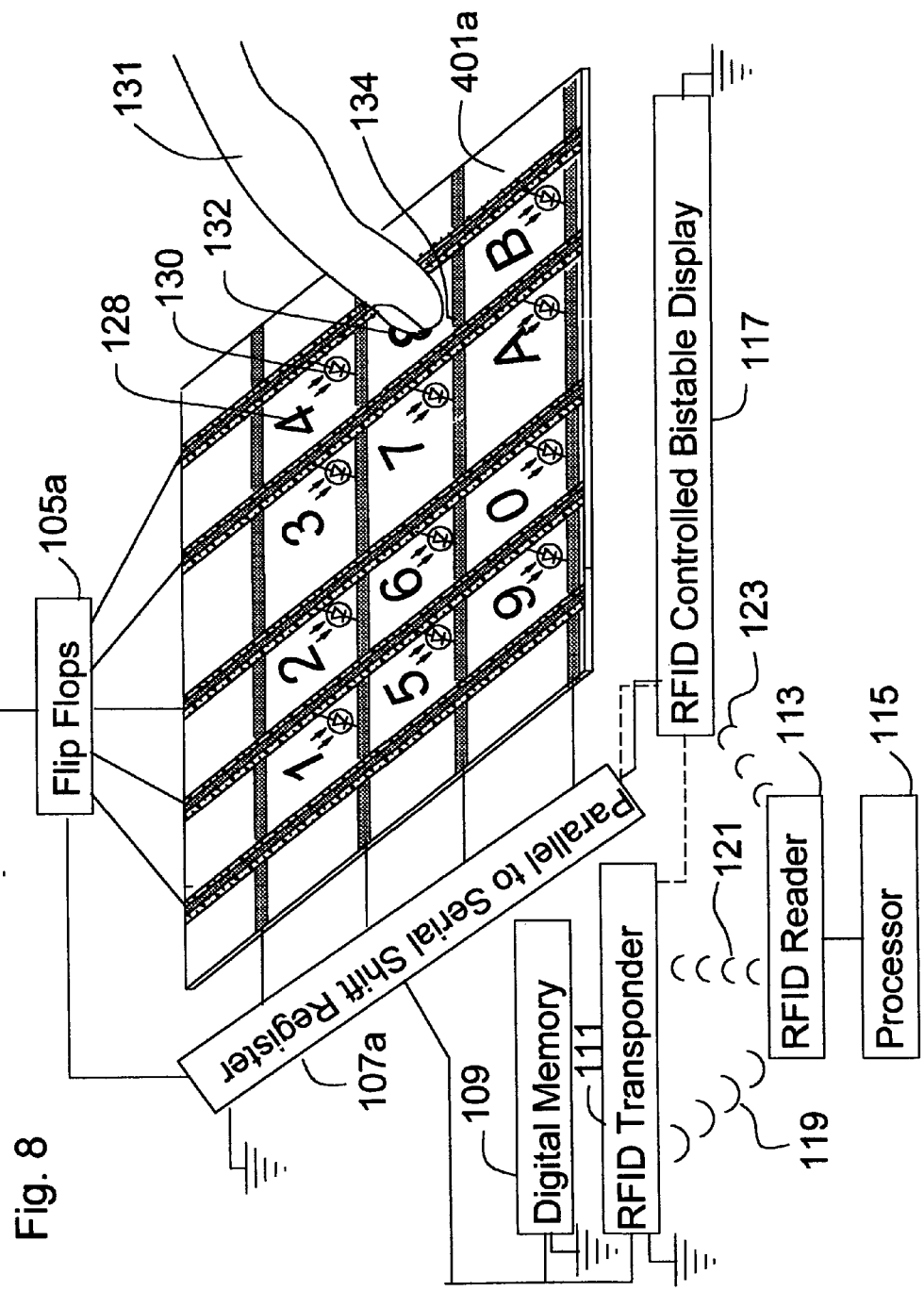

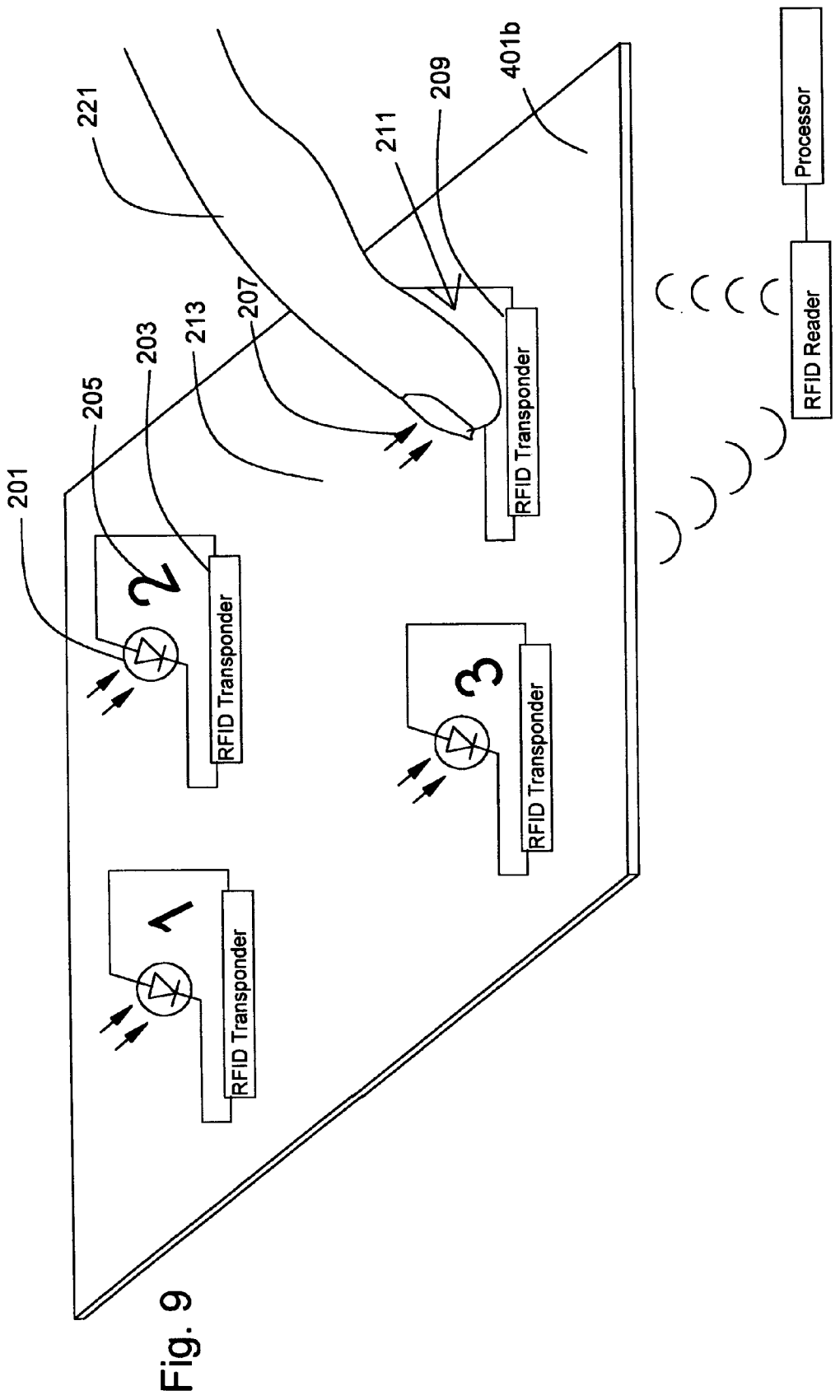

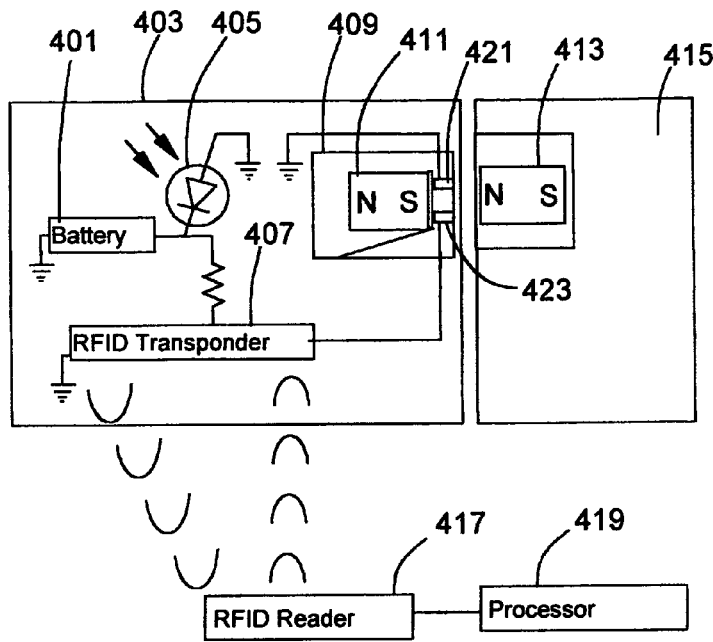
Fig. 10a
Fig. 10b
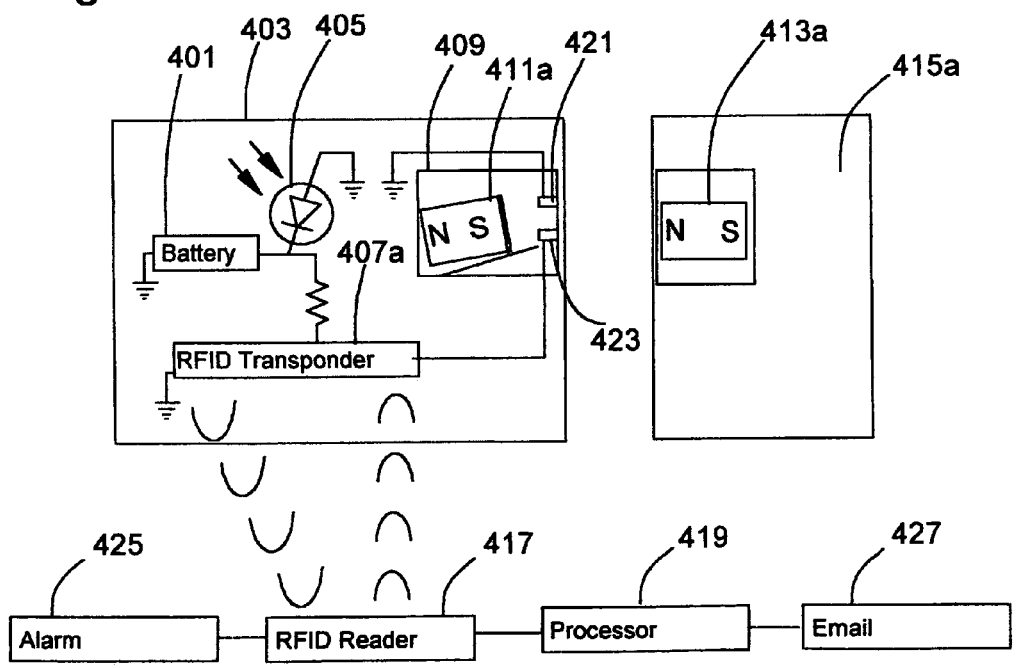

PHOTON SENSOR USER MANIPULATED TOUCH INTERFACE

PRIOR AND RELATED APPLICATIONS

This application is a Continuation In Part of U.S. patent application Ser. No. 11/224,163 filed Sep. 12, 2005 now U.S. Pat. No. 7,900,844 and of U.S. Provisional Patent Application 60/759,084 filed Dec. 12, 2005 and of U.S. patent application Ser. No. 11/369,491 filed Mar. 7, 2006, now U.S. Pat. No. 7,570,166 of U.S. patent application Ser. No. 11/376,799 filed Mar. 16, 2006 now abandoned, and of U.S. patent application Ser. No. 11/482,216 filed on Jul. 7, 2006 now abandoned.

BACKGROUND FIELD OF INVENTION

The field of invention relates to a system for enabling a user to input information used to control processes and to create data. More specifically a system using a plurality of contacts in array in electrical communication to capture a user's hand written or machine printed indicia such as alphanumeric characters and converting of indicia to digital information Moreover the system captures the hand writing as a plurality of contact state conversions whereby the user's hand writing is a means for changing a plurality of contacts between a first state and a second state such as from closed to open. The system being suitable for reading using wireless process such as RFID. The system produces digital out put for storage in a memory or for reading by an external process.

BACKGROUND-DESCRIPTION OF PRIOR INVENTION

Arrays of contacts in the prior art make electrical connections on a circuit as a means of configuring the mean of the output of a circuit. The present applicant has described suitable means for capturing a user's written indicia through connections made or destroyed when the user writes on a substrate and then converting those user directed changes into a digital output which is used by a character recognition process to convert the user indicia into meaningful data to drive systems and processes. Passive RFID transponders in the prior art are commonly used in logistics systems whereby a reader sends a RF signal which is received by a passive transponder which converts the received radio signal into and electric current which is used to power a responding signal from the transponder to the reader. The transponder's responding signal comprising a modulation that communicates unique identification information generally without real-time human interaction. The present invention combines arrays of contacts and with an REID transponder to create wireless user input/output devices that require no batteries to operate offering multiple and significant objects and advantages. The present invention can add an optional display where the user inputs information on the wireless input device, the reader receives the user input, a connected processor interprets the user input, the reader sends the interpreted user input to a display (such as a bi-stable wireless and batteryless display) so the user can confirm that the interpreted data accurately reflects the user input or that intended processes are executed. The present invention can add a supplemental passive power supply such as a photovoltaic system or a PIN diode for respectively converting photons or radio waves to electric power to power a wireless communication such as using RFID.

BRIEF SUMMARY

The present invention combines arrays of with an RFID transponder to create wireless user input devices that require no batteries to operate offering multiple and significant objects and advantages. The devices enable capturing of a user's handwritten or machine printed indicia and creating a corresponding output that can be converted to data using a character recognition process. An optional display is added whereby data or instructions initiated by the user input are displayed upon the display with the user input and the display out put both passing through an RFID reader thus ensuring accuracy of interpretation of user input and instructions. Thus the present invention offers a significant advancement in the ability to communicate an unlimited range of information in a multiform low cost wireless interface without complex integration problems and without need for batteries.

OBJECTS AND ADVANTAGES

Accordingly, several objects and advantages of the present invention are apparent. It is an object of the present invention to provide a means to reliably and inexpensively communicate very wide range information using an RFID technique. It is an object of the present invention to provide a means to reliably and inexpensively communicate a very wide range information using a wireless technique.

It is an advantage that a user can communicate information wirelessly and without batteries.

It is an advantage of the present invention that user written indicia or alphanumeric characters can be converted to data autonomously.

It is an advantage of the present invention that user written indicia or alphanumeric characters can be stored in a mechanical form that can be read in real time.

It is an advantage of the present invention that user written indicia or alphanumeric characters can be stored in a mechanical form that can be read at a subsequent time.

It is an advantage of the present invention that user written indicia or alphanumeric characters can be output in an electrical or digital form for storage in a connected electrical memory or for reading by a wireless process.

It is an advantage of the present invention that it can utilize nearly any wireless method such as SAW or an RFID transponder chip, circuit, and antenna that is known in the prior art.

It is an advantage of the present invention that it can utilize nearly any reader that is known in the RFID industry.

It is an advantage of the present invention that it can utilize many reading approaches or protocols such as ALOHA, tree walking or binary tree, FDMA, and CDMA.

It is an object of the present invention to create a data input and communication means for a wide range or uses. It is an advantage of the present invention to eliminate the need for batteries in wireless devices. It is an advantage of some embodiments that they are completely solid state with no moving parts. It is an advantage of the present invention that complex integration of circuits together is not required. It is an advantage that something as simple as a sheet of paper with contacts printed thereon and connected to an inexpensive RFID transponder circuit can be used as a data input, capture, and output device replacing something as complicated as a computer keyboard for example. It is an object of the present invention that it can take the form of a stick on sheet that can be stuck nearly anywhere one desires a wireless user indicia input or system control device. It is an advantage of the present invention that it can be integrated with a display output system such that user inputs can be confirmed wirelessly and batterylessly on an inexpensive bistable display.

Further objects and advantages will become apparent from the enclosed figures and specifications.

DRAWING FIGURES

FIG. 1a illustrates a blank substrate.

FIG. 1b illustrates contact rows printed upon the substrate.

FIG. 1c illustrates insulation columns printed upon the substrate.

FIG. 1d illustrates contact columns printed upon the substrate.

FIG. 1e illustrates a capacitor connecting a column to a row.

FIG. 1f illustrates a diode connecting a column to a row.

FIG. 4 illustrates a hand writable substrate with user alterable components exposed and other components covered.

FIG. 8 illustrates the art of FIG. 6 configured and utilized as a key input device.

FIG. 9 illustrates individual photo-electric devices integrated with RFID transponder elements and operated as a key input device.

FIG. 10a illustrates a photo-electric powered RFID readable sensor in first state.

FIG. 10b illustrates a photo-electric powered RFID readable sensor in second state.

DETAILED DESCRIPTION OF THE INVENTION

Figure 2B:
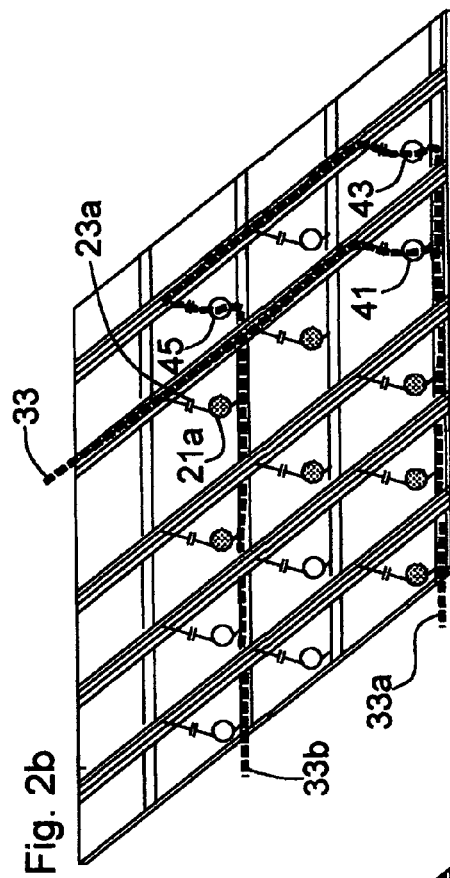
FIG. 2b illustrates the current flow on a capacitor contact array caused by contacts a user's written indicia has transitioned from a first state to a second state.

This application is a Continuation In Part of U.S. patent application Ser. No. 11/224,163 filed Sep. 12, 2005 and of U.S. Provisional Patent Application 60/759,084 filed Dec. 12, 2005 and of U.S. patent application Ser. No. 11/369,491 filed Mar. 7, 2006, of U.S. patent application Ser. No. 11/376,799 filed Mar. 16, 2006, and of U.S. patent application Ser. No. 11/482,216 filed on Jul. 7, 2006. These applications are incorporated in their entirety herein by reference and contain relevant aspects to the present invention that are not included herein to avoid redundancy.

FIG. 1a illustrates a blank substrate 401. The blank substrate comprises a solid material upon which can be printed, deposited, or otherwise adhered a series of electrical connections, electrical insulators, and electric components as described herein. One cheap substrate upon which such processes have been demonstrated is paper. In some embodiments a transparent substrate made of plastic may be preferred for example when operating the substrate in front of a display such as for a wireless touch screen device.

FIG. 1b illustrates contact rows printed upon the substrate including a first electrically conductive row 605 which is separated from other conductive rows by a non-electrically conductive inert space 603. Only two rows are illustrated but in practice any number or rows and alternating inert spaces greater than two can be so printed using ink and processes demonstrated and well documented in the prior art. The electrically conductive rows adhere to the surface of the substrate. The printing of electrically conductive rows comprising a first layer in the fabrication of a user input device.

FIG. 1c illustrates insulation columns printed upon the substrate including a first electrically insulating column 607 and a second electrically insulating column 609. Where it makes contact, the electrically insulating material adheres to the substrate and the electrically conductive rows respectively. Only two columns are illustrated but in practice any number or columns and alternating inert spaces greater than two can be so printed using materials and processes demonstrated and well documented in the prior art. The printing of electrically insulating columns comprising a second layer in the fabrication of a user input device.

FIG. 1d illustrates contact columns printed upon the substrate including a first electrically conductive column 611 which is separated from other conductive columns by the non-electrically conductive inert space 603. Each respective electrically conductive column is printed on top of and adheres to an insulating column for example the first electrically conductive column 611 is printed on top of the first insulating column 607 such that it is electrically insulated from the first electrically conductive row 605 and other rows. A second electrically conductive column 613 is similarly printed. Only two electrically conductive columns are illustrated but in practice any number or columns and alternating inert spaces greater than two can be so printed using ink and processes demonstrated and well documented in the prior art. The printing of electrically conductive columns comprising a third layer in the fabrication of a user input device.

FIG. 1e illustrates a capacitor connecting a column to a row such as a first capacitor 23 which is printed in a layered printing process by multiple companies including by Motorola and by Telxon Corporation as described in U.S. Pat. No. 6,603,400. On a first end, the first capacitor 23 is in electrical communication with the second electrically conductive column 613. On a second end, the first capacitor 23 is in electrical communication with the first electrically conductive row 605. A frangible electrically conductive spot 21 is comprised of a material that electrically connects the first capacitor 23 to the first electrically conductive row 605. The electrical conduction created by the frangible electrically conductive spot 21 can be destroyed in a user writing process as described in FIGS. 2a and 2b. The frangible spot is a conductive material such as ink that can be readily scratched off in the user writing process, To ensure the spot will readily separate from the substrate when written upon by a user, a "slippery layer" (not shown) can first be printed upon the substrate and the frangible spot then printed thereon and have a relatively weak adherence to the substrate, similar materials and processes are used for so called scratch-off game cards. Alternately, frangible spot is a conductive material such as a brittle ink that can be readily crushed off in the user writing process, such materials being printed on top of a material such that it does no fully adhere to the substrate. While only one capacitor and frangible connecting dot are shown, in practice many such components are similarly fabricated at each intersection of a column and a row as is depicted in FIG. 2a. The operation of the substrate with a plurality of arrayed capacitors being discussed in FIGS. 2a and 2b. Another fabrication step comprising covering the components except the frangible dots is described in FIG. 5.

FIG. 1f illustrates a diode connecting a column to a row such as a first diode 25 which is printed in a layered printing process as has been demonstrated by multiple companies including by Motorola. On a first end, the first diode 25 is in electrical communication with the second electrically conductive column 613. On a second end, the first diode 25 is in electrical communication with the first electrically conductive row 605. A second frangible electrically conductive spot 27 is comprised of a material that electrically connects the first diode 23 to the first electrically conductive row 605. The electrical conduction created by the second frangible electrically conductive spot 21 can be destroyed in a user writing process as described in FIGS. 3a and 3b. The frangible spot is a conductive material such as ink that can be readily scratched off in the user writing process, such materials being printed on top of a material such that it does not fully adhere to the substrate, similar frangible layers and inks known to be used in so called scratch-off games. Alternately, the second frangible spot is a conductive material such as a brittle ink that can be readily crushed off in the user writing process, conductive brittle conductors such as ceramics being known in the prior art, such materials being printed on top of a material such that they do not fully adhere to the substrate. While only one diode and frangible connecting dot are shown, in practice many such components are similarly fabricated at each intersection of a column and a row as is depicted in FIG. 3a. The operation of the substrate with a plurality of arrayed diodes being discussed in FIGS. 3a, 3b, and 5. Another fabrication step comprising covering the components except the frangible dots is described in FIG. 5.

Note that FIG. 1e and FIG. 1f are alternate ways of producing a substrate suitable for capturing inputs including user inputs as described herein and communicating them including in RFID applications as described herein.

FIG. 2a illustrates a first user written indicia character 31 written by a user upon a capacitor contact array using a non-electrically conductive ink pen or a non-electrically conductive pencil. In practice, the fully fabricated substrate will look to the user similar to that described in FIG. 4 specifically, the only electrical components that are exposed to the user are the frangible dots and the user otherwise sees only a paper substrate layer on top according to FIG. 4. Note that for an opaque embodiment, a paper substrate is suitable and for a transparent embodiment transparent plastic is a suitable substrate. By contrast, in the FIG. 2a illustration, all of the electrical elements are show together with the user's written indicia on top of them. As the user writes the first user written indicia character 31 together with many other characters (not shown) the user destroys the electrical conductivity of all frangible dots that the written characters are written upon as is described in FIG. 2b. Thus as is later described, the electrical output of each capacitor can be transitioned from a first state (of being connected) to a second state (of being disconnected) by the hand writing of a user and as has been abundantly described in the related patent applications, these user alterations between states can be used to capture and communicate inputs including user inputs by out putting the connected status of each intersection of a row and a column.

Figure 2A:
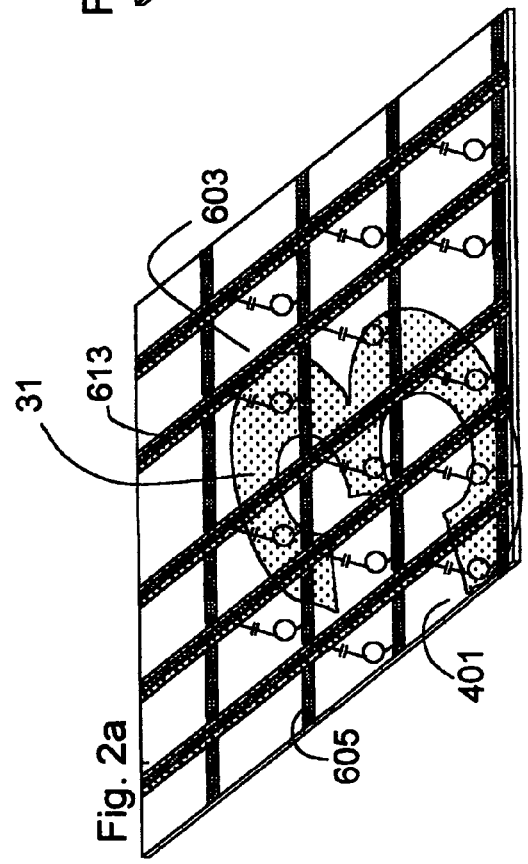
FIG. 2a illustrates a user written indicia character written upon a capacitor contact array.

FIG. 2b illustrates the current flow through a column in a capacitor contact array caused by contacts a user's written indicia has transitioned from a first state to a second state. A first altered frangible dot 21a is one of several where the user has altered conductivity from a first conductive state to be a second non-conductive state and accordingly a disconnected capacitor 23a is no longer electrically connected to a row. Thus when a first electrical current 33 enters the second electrically conductive column 613, it can not flow to the first electrically conductive row 605 via the disconnected capacitor 23a Capacitors which have not been disconnected by the user's writing such as first connected capacitor 41 receive the first electrical current 33 and pass it to a respective connected row to be first time domain output 33a. Note that the first connected capacitor 41 causes the first time domain output current to be time delayed as is a common property of capacitors. It is possible that the first electrical current that flows through the first connected capacitor may flow backwards through a second connected capacitor 43 and then through a third connected capacitor 45 to become a second time domain output 33b. The second time domain output can be differentiated from the first time domain current since the later has been delayed by at least two capacitors whereas the former was delayed by only one capacitor. The timing of the shift register is made such that the later second time domain output current 33b will not be read as having come through the disconnected capacitor 21a. Thus the shift register will emit an output that indicates that the first connected capacitor 41 was not altered by the user's writing while the disconnected capacitor 21a was altered by the user as described by the related patent applications reference herein, a map of areas altered by a user can be read out and converted to data. Note that in operation, it may be desirable that capacitors be discharged between each column's reading and components and processes for achieving this are known in the prior art and suitable for incorporating herein. Note that in operation as described in the related applications, electrical current is only supplied to one column at a time using an array of flip-flops and is received from one row at a time using a parallel to serial shift register. This is a method for reading the user's inputs on the substrate.

FIG. 3a illustrates a second written indicia character 71 written by a user upon a diode contact array using a non-electrically conductive ink pen or a non-electrically conductive pencil. In practice, the fully fabricated substrate will look to the user similar to that described in FIG. 4 specifically, the only electrical components that are exposed to the user are the frangible dots and the user otherwise sees only a paper substrate layer on top according to FIG. 4. By contrast, in the FIG. 3a illustration, all of the electrical elements are show together with the user's written indicia on top of them. As the user writes the second user written indicia character 71 together with many other characters (not shown) the user destroys the electrical conductivity of all frangible dots that the written characters are written upon as is described in FIG. 3b. Thus as is later described, the electrical output of each diode can be transitioned from a first state to a second state by the hand writing of a user and as has been abundantly described in the related patent applications, these user alterations between states can be used to capture and communicate inputs including user inputs by outputting the status of each intersection of a row and a column. Note that frangible dots that are not written upon are not destroyed an their diodes remain connected to both a row and a column. The out put of the system comprising a map of altered frangible dots compared to unaltered frangible dots.

Figure 3B:
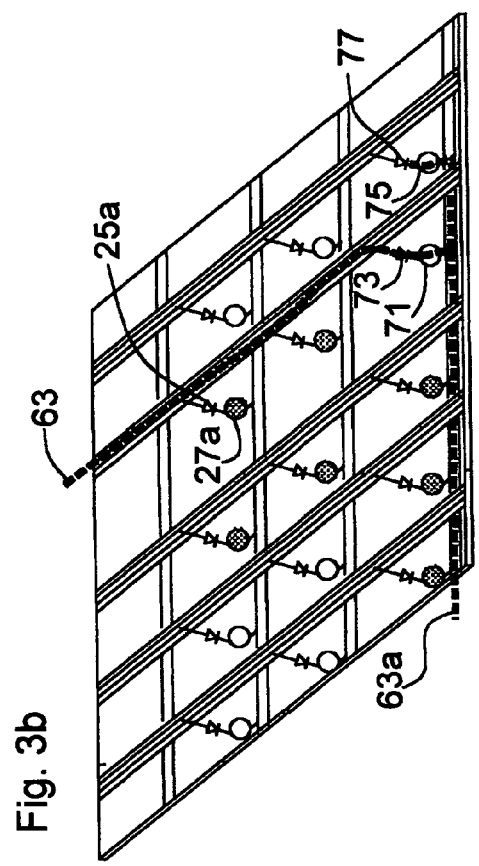
FIG. 3b illustrates the current flow on a diode contact array caused by contacts a user's written indicia has transitioned from a first state to a second state.
Figure 3A:
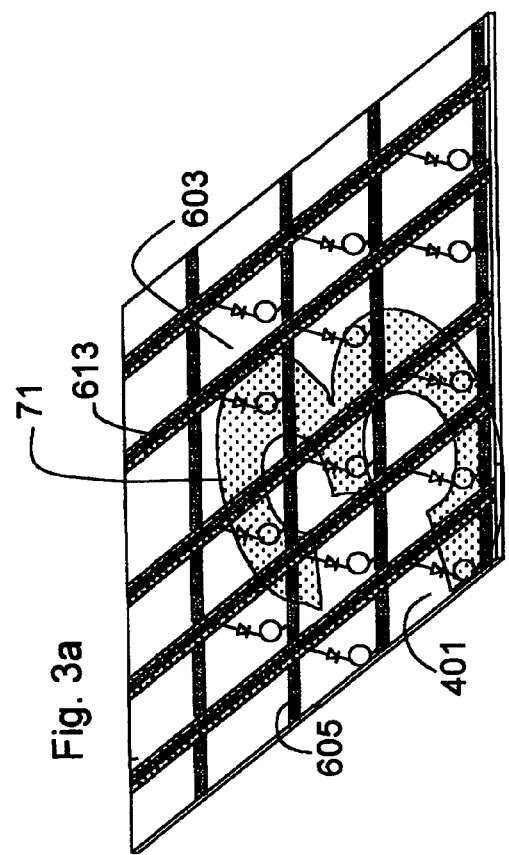
FIG. 3a illustrates a user written indicia character written upon a diode contact array.
Figure 5:
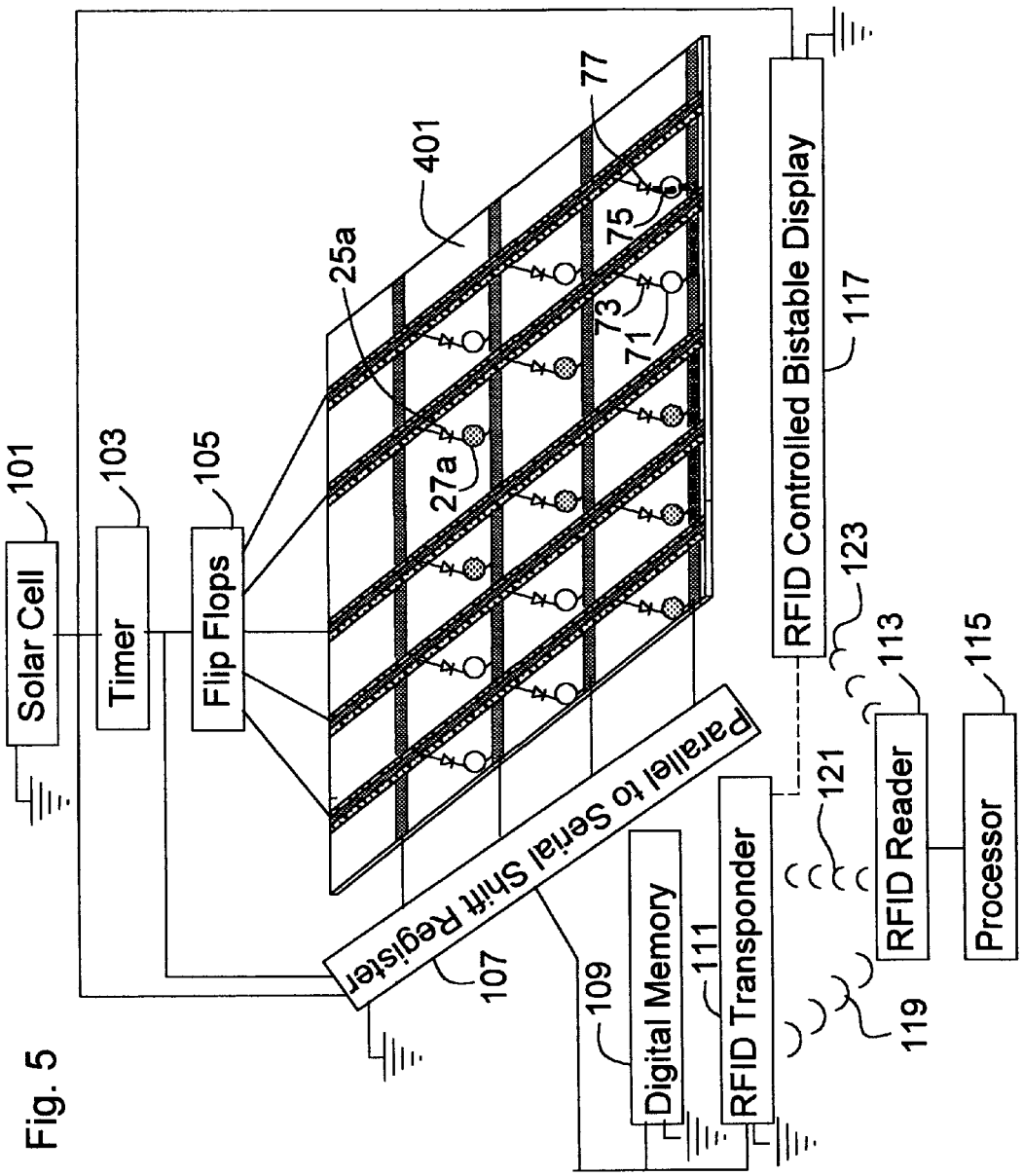
FIG. 5 illustrates the art of FIG. 3b integrated with RFID elements and a system level power supply.

FIG. 3b illustrates the current flow through a column on a diode contact array after some contacts that a user's written indicia has transitioned from a first state to a second state. A second altered frangible dot 27a is one of several where in writing indicia, the user has altered conductivity from a first conductive state to be a second non-conductive state and accordingly a disconnected diode 25a is no longer electrically connected to a row. Thus when a second electrical current 63 enters the second electrically conductive column 613, it can not flow to the first electrically conductive row 605 via the disconnected diode 25a. Diodes which have not been disconnected by the user's writing such as a first connected diode 73 receive the second electrical current 63 and pass it to a respective connected row to be a diode row output 63a where it can be sensed and converted to a serial signal by a parallel to serial shift register such as is illustrated in FIG. 5. The second electrical current that flows through the first connected diode can not flow backwards through other diodes due to bias properties common in diodes. The timing of the shift register is made such that the row connected by the first connected diode is sensed as being in a first state (not being altered by the user's writing) and the disconnected row is sensed as being in a second state (being altered by the user's writing). Thus the shift register will emit an output that indicates that the first connected diode was not altered by the user's writing while the disconnected diode 21a was altered by the user as described by the related patent applications referenced herein, areas altered by a user can be read out using RFID modulation and converted to data. Note that in operation as described in the related applications, electrical current is only supplied to one column at a time using an array of flip-flops and is received from one row at a time using a parallel to serial shift register. This is a method for reading the user's inputs on the substrate.

FIG. 4 illustrates a hand writable substrate with user alterable components exposed and other components covered by a top substrate 403. The top substrate is a layer of paper or plastic that is adhered to the underlying substrate and electrical components such that the user can write upon the top substrate. The only electrical components that are exposed through the top substrate are the frangible dots so that a user's writing will be able to alter electrical connections such that the user's writing can be read out according to this invention. Note that in FIGS. 1a through 4, a very small number of dots per indicia character are shown which would yield a very low resolution output. In practice many more dots per character are used to ensure a high resolution output.

FIG. 5 illustrates the art of FIG. 3b integrated with RFID elements and a system level power supply 101. The system level power supply may comprise a photo-electric element such as a solar cell that converts photons to an electrical current. Photodiodes are well known means commonly used to convert electromagnetic radiation to an electrical current. PIN diodes being a class of diodes suitable for converting electromagnetic radiation in the radio wave frequency into an electric current which can be a suitable power supply. Nanoident Technologies in Austria being one company that has demonstrated organic photodiodes. A solar cell enables the system to effectively be an active RFID transmission system with a greater read distance yet not needing replaceable batteries. A rechargeable battery (not shown) may also be integrated with the power supply 101 such that the battery powers the system and is periodically charged by the solar cell or PIN diode. A timer 103 controls a flip-flop array 105 to operate in sync with a parallel to serial shift register 107 such that inputs into the substrate are read out accurately as has been described in prior applications referenced and incorporated herein. A data stream describing the status of connections and disconnections on the substrate is output by the parallel to serial shift register 107 which can be used to modulate an RFID transponder 111 to output a wireless transponder signal 119 which can be sensed by an RFID reader 113 which engages in a dialog with the RFID transponder 111 including a wireless reader signal 121 from the RFID reader 113 to the RFID transponder 111. A processor 115 is in communication with the RFID reader 113 so as to interpret the signal from the RFID transponder 111 and convert it to meaningful data The RFID reader 113 may also provide a wireless display image signal 123 which can be received either by the RFID transponder 111 and then communicated to an RFID controlled display 117 or alternately the RFID reader 113 may also provide a wireless display image signal 123 which can be receive directly by an RFID tag (not shown) in communication the RFID controlled display 117. In either case, the processor interprets the user's input and determines what will be displayed on the display. The substrate apparatus and the display apparatus need not be otherwise electronically linked to one another but can operate as independent units where all of the processing and other electronics are off loaded to the electronics in connection with the reader. The substrate apparatus and display can be mechanically integrated to provide a form factor similar to a lap-top computer but costing 10% as much. In either case, the signal that is received by the RFID reader 113 and converted to meaningful data by the processor 115 is used to drive the RFID controlled display 117 such that a user can see the display to confirm that user inputs into the substrate are properly being interpreted and instructions properly executed by the processor. The substrate and display combination can be used similar to a laptop computer or a tablet PC with the advantage that all of the most complex electronics and processing power are off loaded to a unit outside of the laptop. The Laptop being a so called dumb terminal capable of capturing and wirelessly reporting user inputs to a remote computer which handles the processing of user inputs and then wirelessly reports inputs and status to the RFID controlled display to provide a user readable output from the remote computer. Such a dumb laptop terminal being very cheap in manufacture compared to a traditional laptop having all of the processing capability onboard. Also multiple dumb terminals (not shown) can concurrently be in communication with the RFID reader 113 and share the connected computing resources such as the processor 115, software applications (not shown), and data storage (not shown) such that multiple dumb lap-tops can be operated concurrently very cheaply in a so called distributed computing model. The power supply 101 also powering the RFID controlled display 117. Note that the data stream describing the status of connections and disconnections on the substrate that is output by the parallel to serial shift register 107 can also be stored in the memory 109 that may later be output through the RFID transponder 111. The memory can be integrated into the RFID transponder or may be separate from the RFID transponder.

It should be noted that throughout this application, elements such as the timer 103 the flip-flop array 105 and the parallel to serial shift register 107 can comprise printed integrated circuits or silicon based integrated circuits and that electronic connections to either have been demonstrated in the prior art. Also printable transistors have been demonstrated that can be used as switches or otherwise integrated herein. RFID tags or inlays have been integrated with additional electrical components such that integration with the elements described herein can be achieved by those skilled in the art. Similarly many low power or bistable displays and display addressing means have been described in the prior art that can be integrated herein to include pixels powered by the described means to be modulated according to the instructions in a wireless signal.

Figure 6:
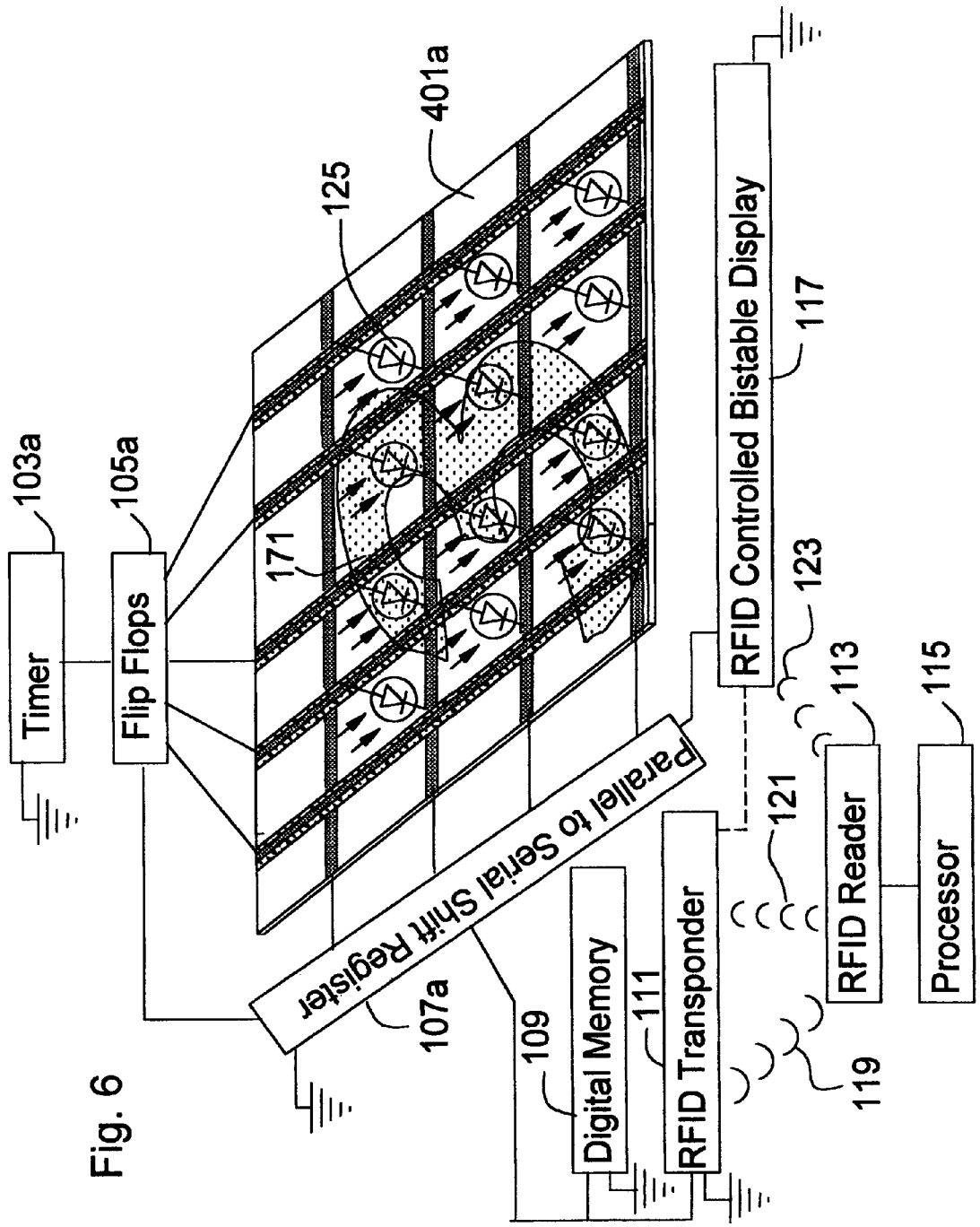
FIG. 6 illustrates the art of FIG. 5 integrated with RFID elements and a component level power supply.

FIG. 6 illustrates the art of FIG. 5 integrated with RFID elements and a contact level power supply. Whereas in FIG. 5 a system level power supply was used and the connections of diodes was read to form the digital output of the system with each diode representing a single binary digit and the binary language being one of a first state being connected and a second state of being disconnected, in FIG. 6 a plurality of photoelectric diodes in array is integrated at the binary digit level of the system to provide both the means to capture the input into the system and the means to power the reporting and output of the system the electricity producing status of diodes is read to form the digital output of the system with each photoelectric diode representing a single binary digit and the binary language being one of a first state being that of producing a first level of current and a second state being that of producing a second level of current (such as no current at all) the status of each photoelectric diode can be read to form the output of the system. A first current producing photoelectric diode 125 is one of a plurality of photoelectric diodes in array on an alternate substrate with contact level power 401*a* Note the diodes of FIG. 5 are replaced by photo diodes in FIG. 6. Each photo diode such as the first current producing photoelectric diode 125 is capable of receiving electromagnetic radiation such as photons and converting it into an electric current. Each photoelectric diode is electrically connected to a respective column and a respective row. The photo diodes are preferably of the organic printable type such as has been demonstrated by multiple companies and institutions working in OLEDs and by Nanoident Technologies and Motorola. After the substrate including all elements and photo diodes is fabricated, a thin transparent insulating encapsulating layer (not shown) is applied to the entire surface of the substrate and all components thereon such that the substrate and components thereon are electronically insulated from the user. Encapsulating layers being common in the organic display industry. Thus, when the user writes upon the substrate encapsulating layer such as a third written indicia character 171, no electrical connections are altered such as being completed, disconnected, or otherwise altered by the writing. Instead what the user's writing alters is the electromagnetic radiation (or light) flow to specific photoelectric diodes that fall under and are eclipsed by the indicia characters written by the user. The user writes with an ink marker capable of writing on non-porous substrates such as an un-erasable marker or alternately the user writes with an ink marker that is erasable and capable of writing on non-porous substrates such are commonly used with white boards. In either case, the ink written by the user upon the encapsulation layer shuts off or restricts the electromagnetic radiation (or light) from being incident upon respective photodiodes under the shadow of the written indicia. These photodiodes cease to produce any electric current such as is the case with a current non-producing photodiode 127 of FIG. 7 or alternately, the current they produce is diminished. By contrast, photodiodes not falling under the user's written indicia shadow continue to be exposed to electromagnetic radiation at a first higher level and therefore to produce a corresponding current such as the first current producing photo-electric diode 125. The alternate parallel shift register 107*a* together with the alternate flip-flops series 105*a* operating in accordance with an alternate timer 103*a* senses which photoelectric diodes are producing a higher level of electric current (in a first state) and which are producing electric current at a lower level or not at all (in a second state). The state of each photoelectric diode is reported from the alternate parallel shift register 107*a* to either a memory for storage or to an RFID modulator for wireless transmission to a reader as discussed in other sections of this application and related applications. Thus the user's writing transitions photodiodes from a first state to a second state and those states are reported as the means to describe written indicia characters created by the user. Each photodiode representing one digit in a binary output signal. The processes for converting the output to data having been described in the related applications incorporated herein.

The system of FIG. 6 can be used to sense and report other phenomenon such as a user's key strokes as described in FIG. 8 the position of a mouse, or non-human inputs can be similarly sensed and reported. A PIN diode capable of converting non-photon electromagnetic radiation such as in the RF spectrum can be substituted for the photoelectric diodes herein.

Figure 7:
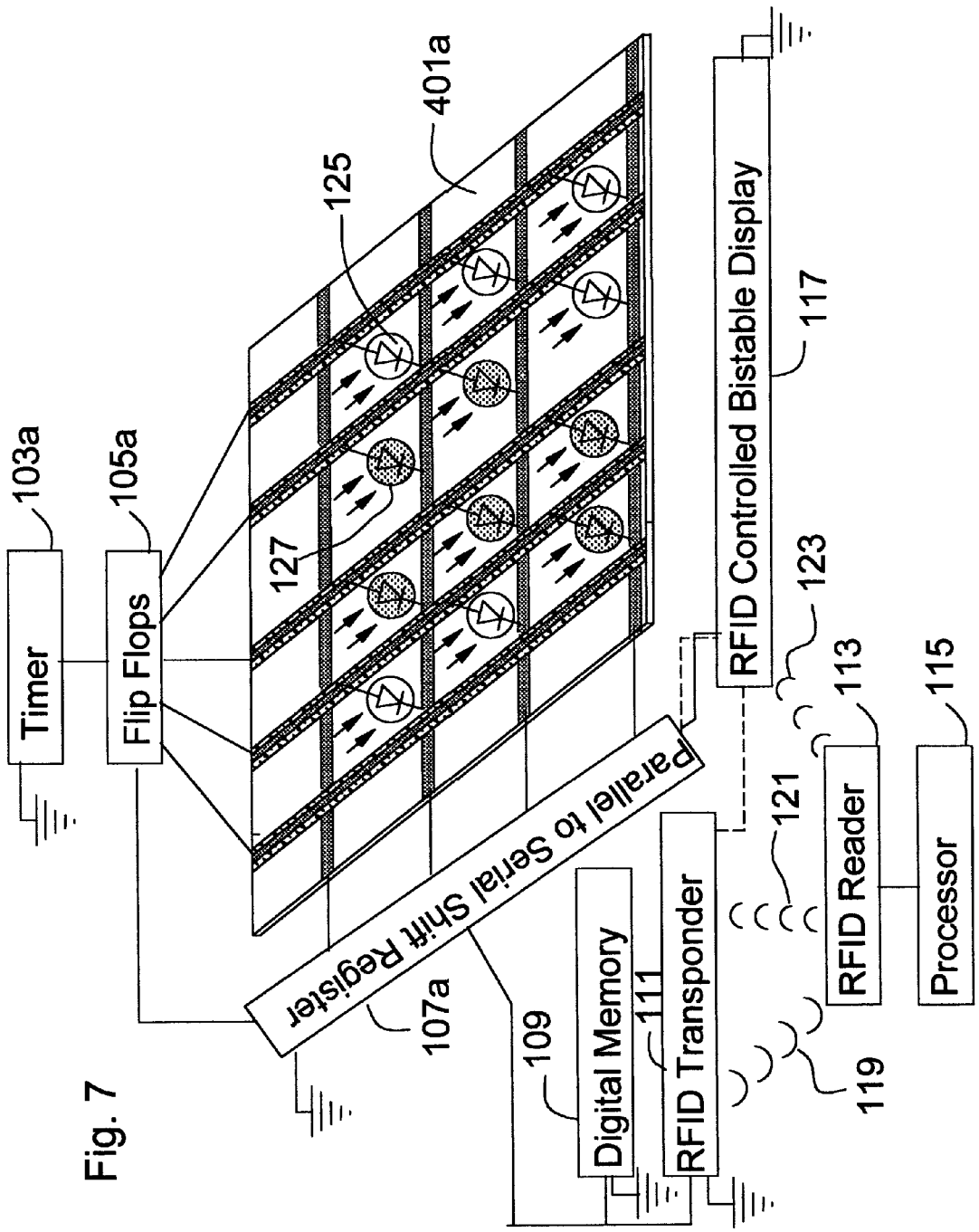
FIG. 7 illustrates the art of FIG. 6 with select contacts transitioned to a second state by user written indicia.

FIG. 7 illustrates the art of FIG. 6 with select contacts transitioned to a second state by user written indicia. Note that the resolution depicted in this Figure and the others in this application is for illustrative purposes only, in practice many more photo-electric diodes will be covered by a single character such that read out can accurately distinguish between characters. As is described in the related applications each photoelectric diode represents one pixel in an image map that the system outputs and is interpreted by a processor for conversion to data. The contact level photo diodes can power the timer, flip-flops, shift register, memory, RFID transponder, and RFID display of FIGS. 6, 7, and 8 similarly as is described in FIG. 11 or alternately a separate power source such as that of FIG. 5 can be provided to power the system. In operation, the hand writable RFID readable substrate of FIG. 7 is first manufactured and then a user writes upon the surface of the substrate. The user's writing alters the current producing status of some photoelectric diodes and does not alter the current producing status of other diodes. Background electromagnetic radiation is incident upon the substrate such that all photo-electric diodes that are not written upon produce a first level of electric current in a first state and all photoelectric diodes that are written either do not produce an electric current or produce a second lesser level of current in a second state. In an iterative process, the timer, flip-flops, and parallel to serial shift register operate in coordination to sense and report the current producing state of each individual photoelectric diode and output through the parallel to serial shift register as a serial stream of digital data whereby each photoelectric diode in the first state is represented by a first "on," digital signal and each photoelectric diode in the second state is represented by a second "off" digital signal. The digital output being reported out the RFID transponder as a modulated signal or stored in a memory. The digital output also being interpreted by a processor so that an interpretation can be reported to a display to enable a user to visibly confirm accurate interpretation of their inputs and that their inputs are controlling remote processes and systems as desired. Alternately, in an image sensing application, the intensity of the output of each photoelectric diode may be sensed and reported along with the "off" or "off" state. It should also be understood that some of the photoelectric diodes may sense electromagnetic radiation in a first wavelength while others of the photoelectric diodes may sense electromagnetic radiation in a second wavelength. Further, the user can use multiple markers each respective marker capable of altering the current producing state of photoelectric diodes in a different respective wavelength. If an erasable marker is used, the writing of the user can be erased and the substrate can be reused (written upon, reporting out, and erased) many times. The substrate and processes of FIGS. 5, 6, 7, 8, 9, and 11 can operate as a wireless and batteryless position sensor for example, the position of a computer mouse shaped plastic object (not shown) placed and moved upon the encapsulation layer of the substrate can be transduced by sensing which photodiodes are under its shadow with those under the shadow being in a first current producing state and those not under its shadow being in a second current producing state the system iteratively checks how the shadow is moving and uses the movement to control a computer such as the position of a curser. A photo sensor array sensing, powered, and reporting system such as is described in this Figure and others can operate as an RFID position transducer array being capable of reporting positions of objects subject to change by non-human initiated force or process.

Figure 11:
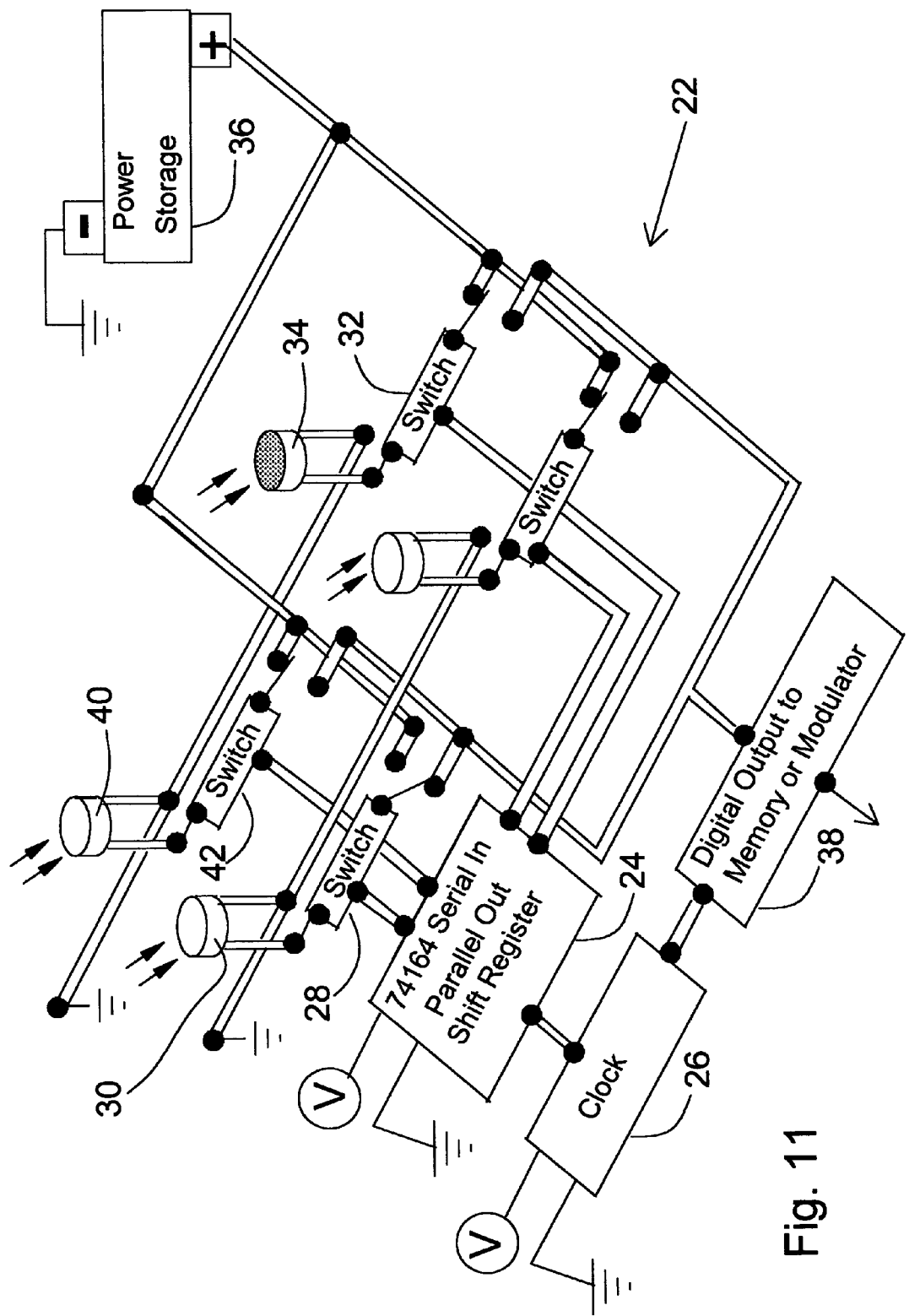
FIG. 11 illustrates a photoelectric sensor array utilizing photo sensor elements for sensing input and powering output.

FIG. 8 illustrates the art of FIG. 6 and FIG. 7 configured and utilized as a key input device. During fabrication, a first machine printed symbol 128 is printed upon the encapsulation layer of the substrate in such a manor as to be easily seen by a user but not interfere with the photon receiving and electric current creation operation of any photoelectric diodes. Alternately in fabrication the symbols can be first printed upon the blank substrate before the other elements are placed thereon in which case transparent wires and elements may be used. In either case, a plurality of individual symbols are placed on the substrate each in respective proximity to at least one of a plurality of respective individual photoelectric diodes in array. Thus in fabrication, a first proximate photoelectric diode 130 is positioned in proximity to the first machine printed symbol 128. Similarly, a second proximate photoelectric diode 134 is positioned in proximity to a second machine printed symbol 132. In operation, a user's finger 131 can key inputs into the substrate by being placed near a respective symbol as is the case with the user's finger 131 in proximity to the second machine printed symbol 132. Thus in fabrication a plurality of symbols are printed upon the substrate each in proximity to a respective electromagnetic sensor. In operation, the user places his finger (or a stylus) in proximity to a respective symbol to select it for input and thereby restricts the flow of electromagnetic radiation to a proximate electromagnetic sensor, a system reads and reports to a processor via a wireless means the status of each sensor such as which sensor is being altered to be in a second state by the user's interaction and this status information is converted to digital signal that the processor converts to an symbol input meaning selected by the user, the input meaning is then reported to the display so the user can confirm accuracy of their symbol input selection. The system and means for receiving a wireless signal and converting it to a meaningful input being described in the related applications referenced and incorporated herein. The substrate comprising a self-sustaining passive input device that is wireless and does not require replaceable batteries. The art of FIG. 11 illustrates an alternate circuitry for utilizing the states of photodiodes as the means for capturing inputs and powering a system which can be substituted for the circuitry described in FIG. 4, 6, 7, or 8.

It is also possible as has been described in related applications that the substrate can be transparent and have no symbols printed thereon. Such a system is suitable for use as a touchable input device such as a so called touch screen that can be placed in front of a computer display (not shown) and through which a user can interact with a computer in communication with the computer display.

FIG. 9 illustrates individual photo-electric devices integrated with RFID transponder elements and operated as a key input device. As described in prior applications related to the present application and reference herein, arrays of RFID transponder elements can be used as an input system such as a keyboard, a keypad, a touch screen input device, and a hand writable RFID readable substrate for capturing the written indicia of a user. The art of FIG. 9 illustrates that such systems can be integrated with a current producing component such that they can be read by a reader at greater distances similar to an active RFID transponder while at the same time being essentially passive. Whereas a passive RFID transponder is powered by an induced current which comes from an RFID reader and an active RFID transponder generally requires batteries, the current producing components integrated with the RFID transponders can produce the readable distance of an active transponder without the need for traditional batteries. Moreover, in FIG. 9 these devices are configured in an array so as to operate as a unit comprising a plurality of RFID transponders in array and a plurality of photoelectric components such as diodes. A first RFID transponder 203 is adhered to a tag array substrate 401b so as to be in electrical communication with a first current producing component 201 such as a photodiode. The first RFID transponder 203 and/or the first current producing component 201 are positioned on the tag array substrate to be in close proximity with a first alphanumeric character 205.

The first RFID transponder 203, the first current producing component 201, and the first alphanumeric character 205 together comprise a user input key element when used in a keypad, keyboard, or touch screen input device. The first RFID transponder 203, the first current producing component 201, and the first alphanumeric character 205 together comprise a pixel element when used in a handwriting capturing and reporting application, in an imaging application, or in any application that essentially captures and reports a map of the status of elements preferably through a wireless means. The statements of this paragraph are also applicable to the art of input elements of the other Figures herein and of the related prior art referenced herein.

As is the case with all input elements described herein the first input key element is separated from the second input key element by an inert space 213.

A second RFID transponder 209 is adhered to the tag array substrate 401b so as to be in electrical communication with a second current producing component 207 such as a photodiode. The second RFID transponder 203 and/or the second current producing component 201 are positioned on the tag array substrate to be in close proximity with a second alphanumeric character 211. The second alphanumeric character and the second current producing component are covered by a user input finger 221 such that the current flow from the second current producing component has been stopped or diminished to be in a second state compared to the first current component which is in a first current producing state. As is described in this application and the related applications, the stopping or diminishing of current comprises a transition from a first state to a second state which is interpreted as being a user input when sensed by and RFID reader and interpreted by a processor. The RFID reader iteratively checking on the status of each RFID transponder and the processor assigning a user input meaning when a second state signal is sensed (such as no signal at all) form a respective transponder.

In fabrication, the current producing components of FIG. 9 can be integrated with a power storage means such as is described in FIG. 11 with respective output current of each being alternately switched between charging a power storage unit and being reported as to current producing status as the output. Alternately, power storage can be integrated at the element level such that each current producing element is in communication with a respective power storage unit and its current is periodically switched between being stored and reported as output. In either of these cases, even the input elements that are not producing current can perform and output dialog with the reader using power from storage with the ones having a second state current production status being interpreted as a user input.

As a third alternative, the output current of each current producing element can always be directed to be an output such that when current is being produced in a first state, the output is "on," such as is the case with the first described current producing component of FIG. 9 and when the current production is shut off in a second state the output is "off" such as is the case with the second described current producing component of FIG. 9. A reader receives and the processor interprets the "off" outputs as no user input. A reader receives no signal from "off" elements and the processor interprets the lack of a signal as a user input.

As described in this and related prior applications, the mechanism for changing states and thereby capturing a user input can be blocking the mechanism that allows the current producing element to produce current or alternately it can be the shorting of the communication mechanism such as the user's touch being in electrical communication with a component of the input element such as the RFID antenna for example. Alternate mechanisms have been described in related applications which are suitable herein.

FIG. 10a illustrates a photo-electric powered RFID readable sensor in a first state. A remote wireless door sensor 409 comprises a first half which is adhered to the surface of a wall first surface 403 and a second mobile magnetic half 413 that is adhered to a door second surface 415. In a non-actuated state such as in FIG. 10a, the door second surface can be in a relative close proximity to the wall first surface and thereby bridge (or close) electrical contacts, alternately, in an actuated state such as in FIG. 10b, the door second surface can be in a relative far proximity from the wall first surface and thereby open electrical contacts. The contacts that can be alternately opened or bridged include a first contact 421 which is in electrical communication with ground and a second contact 423 which is in electrical communication with an RFID transponder circuit 407. As is described in this application and related applications referenced herein, the state of the contact as to open or closed can be sensed and reported by the RFID transponder circuit 407. The RFID transponder circuit 407 being integrated with a photoelectric cell 405 which is suitable for producing a current that can charge a power cell 401 such as a battery or capacitor so as to provide power for the RFID transponder circuit 407 to produce a wireless signal both when the photoelectric cell is producing a current and when it is not producing a current. When the door is positioned relatively in close proximity to the wall, the second mobile magnetic half 413 exerts a magnetic pull on a magnetic element 411 such that a conductive layer affixed to the surface of the magnetic element 411 is brought into electrical communication with the first contact 421 and the second contact 423 to close or bridge the circuit between the first contact and the second contact as is illustrated in FIG. 10a. The RFID transponder circuit 407 senses and reports to a security RFID reader 417 the fact that the circuit is closed. This communication to the security RFID reader 417 is a wireless signal and the signal is interpreted by a security processor 419 such that the processor does not trigger an a In FIG. 10a, the first contact 421 and the second contact 423 are in electrical communication with one another in a bridged or closed first state.

FIG. 10b illustrates the photo-electric powered RFID readable sensor of FIG. 10a in a subsequent second state. An actuated door surface 415a has been moved together with the actuated second magnet 413a attached thereto. The relative far proximity of the door surface and actuated second magnet 413a affixed there reduces the magnetic pull on a non-contacting magnetic 411a such that the first contact 421 and the second contact 423 are no longer in electrical communication and the circuit is in an open second state. The open state RFID transponder reports to the security RFID reader that the contacts are not bridged and the security processor interprets this as a door opening for which it initiates an alarm 425 response which can be communicated wirelessly through the security RFID reader or hardwired to the security processor. The processor may also utilize connected systems to send a response over an intranet or internet including by sending an email 427.

FIG. 11 illustrates a photoelectric sensor array utilizing photo sensor elements for sensing input and powering output. The art of FIG. 11 illustrates an alternate circuitry for utilizing the states of photodiodes as the means for capturing inputs and powering an output system. It can be substituted for the circuitry described in FIG. 4, 6, 7, or 8. For purposes of illustration, ceramic photodiodes are depicted but in practice the printable or organic photodiodes discussed above are preferred. In fabrication, an electric circuit 22 comprises electrical elements and connections adhered to a substrate for the purpose of capturing and reporting outputs preferably in a wireless system as described in this application and its related applications. An array of photo diodes is provided whereby each diode is connected on a first side to a ground and on a second side to a respective switch Each switch is capable of switching the current produced by a respective photodiode to either be stored in a power storage unit 36 such as a battery or a capacitor or to be directed to a circuit digital output signal 38 so as to be stored in a memory or to modulate an RFID transponder output. At any given point in time only a single switch is activated to direct the current from its respective photodiode to the digital output signal. In an iterative process a serial in parallel out shift register 24 controls which switch will direct its current to the digital output signal 38 and in such a manner that each switch is activated in turn to direct current produced by its respective photodiode to the output from the circuit digital output signal 38. The depicted 74164 circuit is an example of a controller capable of being configured to iteratively switch multiple switches in the desired manor controlled by the signal of a clock 26. The clock also is used to synchronize the circuit digital output signal 38 to ensure that the output signal is understood to have a beginning and an end which is required in order to interpret what the output signal means (which specific photodiodes are producing currents and/or which level of current each is producing.) The electrical circuit 22 comprises a plurality of photodiodes positioned in array similarly to the discussion in previous drawings and whereby the output state of individual photodiodes is used to capture and report inputs. The electrical circuit 22 of FIG. 11 comprises a plurality of individual switches whereby each photodiode's output is directed by a respective switch connected to that individual diode. In an iterative processes the switching status of each switch is changed from directing its output current to a power supply or to an output such that at any given point in time, the current output of all switches except one is directed to charging the power supply and the current of the one switch is directed to the circuit output. The iterative process rotates which respective switch's current output is direct to the output at a given time instance. Power from the power supply is used to drive processes such as the RFID transponder, the memory, the shift register, the clock, a display, etc. such that the system can essentially operate as an active device for example an active RFID transponder while at the same time being passive to the extent of being self sustaining and not requiring battery replacements.

In the depiction of FIG. 11, a first photodiode 40 is in electrical communication on a first side with a ground and on a second side with a first switch 42. The first switch 42 is controlled by the serial in parallel out shift register 24 such that the first switch directs current produced by the first photodiode 40 to the power storage unit 36 such that the power storage unit is charged by the current. While only four switch/photodiode combinations are depicted, in practice, a plurality of many more switches and attached photo diodes (not shown) also direct current to the power storage unit. A second photodiode 30 is in electrical communication on a first side with a ground and on a second side with a second switch 28. The second switch 28 is controlled by the serial in parallel out shift register 24 such that the second switch directs current produced by the second photodiode 30 to the circuit digital output signal 38 such that the digital output signal reflects that fact that the second photodiode is producing a current in a first "on," state. A third photodiode 34 is in electrical communication on a first side with a ground and on a second side with a third switch 32. The third switch 32 is controlled by the serial in parallel out shift register 24 such that the third switch directs current produced by the third photodiode 34 to the power storage unit 36. However, since the third diode 34 has been eclipsed to fall under the shadow of an input such as for example a mouse, a finger, a stylus, a user written indicia character, or an inanimate process, it produces no current. At a subsequent time (not depicted) when the serial in parallel out shift register 24 causes the third switch 32 to switch to be in electrical communication with the circuit digital output signal 38, the signal will reflect the fact that the current flowing from the third photodiode 34 is in a second "off" state of zero and as previously discussed this will be interpreted by a processor as an input which will be shown on a display, saved in memory, modulate an RFID signal, be transmitted wirelessly, be read by an RFID reader, and/or be used to control systems or processes.

The FIG. 11 illustration suggests some traditional prefabricated components be used such as ceramic photodiodes, switches, a 74164 shift register, a clock and power storage. Such traditional prefabricated components can be used and those skilled in the art have integrated such things into a series of printed connections and RFID inlays. Many companies have recently demonstrated one or more method for creating printable diodes, photoelectric current producing elements, capacitors, batteries, transistors, switches, and integrated circuits which are suitable for use herein in a preferred embodiment.

The art of FIG. 11 can operate as a passive camera system that can capture images, transform them into a digital signal, transmit the digital signal, while operating under its own power and not needing to be supplied by external power sources. One or more lenses can be utilized to direct electromagnetic energy to photosensitive elements in desired ways.

Similarly, the art of FIG. 11 can function as a motion detector where an RFID transponder wirelessly reports the output. The wireless signal is received by an RFID reader which is in communication with a processor which interprets changes in the output as motion. Such a system can employ threshold logic to account for changes in lighting conditions such that they are not interpreted as motion. The motion detector can trigger an audible alarm enunciator. As is common in motion detectors, on or more lenses can be added to enable photodiodes to each respectively collect light from different directions.

Alternately, the art of FIG. 11 can function as an infrared motion detector where an RFID transponder wirelessly reports the output. In the infrared embodiment, a mix of infrared and visible spectrum photoelectric diodes can be integrated such that the visible spectrum photodiodes are interspersed and the photodiodes power the system while the infrared diodes provide the output. The wireless signal is received by an RFID reader which is in communication with a processor which interprets changes in the output as motion. Such a system can employ threshold logic to account for changes in lighting conditions such that they are not interpreted as motion. The motion detector can trigger an audible alarm enunciator. As is common in motion detectors, on or more lenses can be added to enable photodiodes and infrared diodes to each respectively collect electromagnetic radiation from different directions.

Similarly, the art of FIG. 11 can function as a smoke detector where an RFID transponder wirelessly reports the output. The smoke detector can incorporate a light emitting element (not shown) such as a OLED of LED and wherein some of the electromagnetic sensing elements are directed to sensing the clarity of the air by receiving light from the light emitting element. Wherein in operation, smoke in the air absorbs or otherwise distorts some of the output of the light emitting element and so diminishes the light sensed by the electromagnetic sensing elements which are directed to sensing the clarity of the air by receiving light from the light emitting element. The wireless output signal of the system involves reporting the intensity of the current produced by the electromagnetic sensing elements which are directed to sensing the clarity of the air by receiving light from the light emitting element. The wireless signal is received by an RFID reader which is in communication with a processor which interprets changes in the output as a smoke condition comprising low air clarity or a non-smoke condition comprising high air clarity. Such a system can employ threshold logic to minimize false alarms. The smoke detector can trigger an audible alarm enunciator. As is common in smoke detectors, on or more lenses can be added to enable OLEDs or LED emitters and photodiode sensors to cooperate efficiently. In the smoke detector embodiment, additional photodiodes are used to charge the power supply so the system can operate in light and in dark.

As throughout this application, the photodiodes of FIG. 11 can be replaced by PIN diodes, sound acoustic wave sensors, or other elements capable of converting one energy form into an electric current which is used to alternately charge a power supply and be reported as a sensor signal.

Operation of the Invention

Operation of the invention has been discussed under the above heading and is not repeated here to avoid redundancy.

Conclusion, Ramifications, and Scope

Thus the reader will see that the Contact Array RFID Readable Input Substrates and Processes of this invention provides a novel unanticipated, highly functional and reliable means for employing RFID techniques in a self powered RFID passive like tag or transponder that comprises an array of contacts or switches that can be used to capture as data a wide range of user inputs and environmental inputs which in turn can be used to drive an unlimited variety of processes.

While the above description describes many specifications, these should not be construed as limitations on the scope of the invention, but rather as an exemplification of a preferred embodiment thereof Many other variations are possible for example:

The description herein illustrates the invention in a passive RFID tag or transponder, but it is understood to also be useful in active RFID tag or transponder systems.

A few applications are described herein but it should be understood that the applications of the present invention are virtually limitless.

Each RFID transponder may include a unique identifier aspect to their RFID readable signature.

Audible or inaudible sound waves can be substituted for electromagnetic radiation energy as the medium to both excite a remote transponder and to be sensed by the transponder and transceiver. For example the RFID based systems described herein can be replaced by a SAW or alternate systems.

The above description in most instances starts with contacts in a closed state and where some are transitioned to an open state by a user's written indicia but, as an alternate, it is understood that the contacts may start in an open state and a user's input can be captured when select contacts are transitioned to a closed state.

The contact array and processes described herein are described as operating wirelessly but it is understood that the output created by such substrates could be communicated via wires.

The contact array is generally described as operating passively without batteries but batteries or another power source such as photovoltaic cells or PIN RF components can be added to increase the range at which the substrate can be read.

The contact array described herein comprises a mechanical form of storage that can be read in real time or at a subsequent time. It will be understood that the mechanical memory can be read out and stored into a digital or electronic memory that is affixed to the substrate and that can be read out according to known RFID processes. Alternately, the digital or electronic memory can be detachable from the substrate so as to be transportable more cheaply that can be the whole substrate.

The present invention describes an RFID wireless process but it will be understood that the substrates descried herein can be utilized by any wireless process such as SAW for example.

As described in the patent applications referenced herein of which this application is a continuation in part, the present invention can be integrated with a display output system such that alphanumeric characters written upon the substrate by a user can be read wirelessly by a reader, interpreted, such as character recognition, by a processor in communication to the reader, the interpreted character then being sent to a wireless display such that the user can see the character which has been interpreted so as to ensure accurate interpretation of the user's input.

A user's pen is described as the means that enables a user to transition contacts from a first state to a second state which thereby alters the signature of a RFID transponder. It will be understood that any means that has the ability to alter the properties of a contact state or circuit can be substituted for the user's pen described herein.

The specifications describe a user interface for communicating information via RFID but it is understood that the devices and processes described can collect data from other processes that are not directly user inputs. For example the contact array of FIG. 1 through 3b can be used as a wireless passive position transducer where the position of a mouse controls the curser on a screen or where a physical structure that is subject to movement which one would like to track wirelessly and passively is monitored. Similarly a button or touch of a finger can be used to close or open connection as an input device. Thus elements of each Figure have applications for communicating status of conditions other than user written indicia inputs.

What is claimed:

1. A user input apparatus comprising: a plurality of photon energy sensors comprising a first photon sensor and a second photon sensor, a substrate, said plurality of photon energy sensors being affixed to said substrate, a photon energy source, a user manipulated mechanism to modulate the incident quantity of photons from said photon energy source such that a greater photon quantity is incident upon said first sensor at a first time and a lesser photon quantity is incident upon said first sensor at a second time, the quantity of photons from said photon energy source incident upon said second sensor at said first time and said second time not being modulated, a processor for receiving a signal indicative of the modulation of said first sensor and for assigning a user input meaning to said modulation, wherein the user manipulated modulation mechanism is one selected from the group consisting of: at said second time said user covers said first photon sensor to reduce energy incident thereon from said photon energy source, at said second time said user casts a shadow upon said first photon sensor, at said second time said user prevents said photon energy source from being incident upon said first photon sensor, at said first time said user uncovers said first photon sensor to increase energy incident thereon from said photon energy source, at said first time said user reduces a shadow upon said first photon sensor to increase energy incident thereon from said photon energy source, and at said first time said user causes said photon energy source to be incident upon said first photon sensor.

2. The user input apparatus of claim 1 wherein the selected user manipulated mechanism comprises one selected from the group consisting of: at said second time said user covers said first photon sensor to reduce energy incident thereon from said photon energy source, and at said first time said user uncovers said first photon sensor to increase energy incident thereon from said photon energy source.

3. The user input apparatus of claim 1 wherein the selected user manipulated mechanism comprises one selected from the group consisting of: at said second time said user casts a shadow upon said first photon sensor, and at said first time said user reduces a shadow upon said first photon sensor to increase energy incident thereon from said photon energy source.

4. The user input apparatus of claim 1 wherein the selected user manipulated mechanism comprises one selected from the group consisting of: at said second time said user prevents at least some energy from said photon energy source from being incident upon said first photon sensor, and at said first time said user causes at least some energy from said photon energy source to be incident upon said first photon sensor.

5. The user input apparatus of claim 1 wherein the assigned user input meaning comprises one selected from the group consisting of: a user command, a position on said substrate, a line, a direction of motion, a character selection, and writing of an indicia.

6. A user input apparatus comprising: a plurality of photon energy sensors comprising a first photon sensor and a second photon sensor, a substrate, said plurality of photon energy sensors being affixed to said substrate, a photon energy source, a user manipulated mechanism to modulate the incident quantity of photons from said photon energy source such that a greater photon quantity is incident upon said first sensor at a first time and a lesser photon quantity is incident upon said first sensor at a second time, the quantity of photons from said photon energy source incident upon said second sensor at said first time and said second time not being modulated, a processor for receiving a signal indicative of the modulation of said first sensor and for assigning a user input meaning to said modulation, wherein the user manipulated modulation mechanism is one selected from the group consisting of: at said second time a finger of said user is placed between said photon energy source and said first photon sensor to reduce photons incident thereon from a greater number to a lesser number, at said first time a finger of said user is removed from between said photon energy source and said first photon sensor to increase photons incident thereon from a lesser number to a greater number, at said second time a writing instrument operated by said user writes a barrier between said photon energy source and said first photon sensor to reduce photons incident thereon from a greater number to a lesser number, at said first time a writing instrument operated by said user removes a barrier between said photon energy source and said first photon sensor to increase photons incident thereon from a lesser number to a greater number, at said second time an object held in said user's hand reduces photon energy incident upon said first photon sensor, and at said first time an object held in said user's hand increases photon energy incident upon said first photon sensor.

7. The user input apparatus of claim 6 wherein the selected user manipulated mechanism comprises one selected from the group consisting of: at said second time a finger of said user is placed between said photon energy source and said first photon sensor to reduce photons incident thereon from a greater number to a lesser number, and at said first time a finger of said user is removed from between said photon energy source and said first photon sensor to increase photons incident thereon from a lesser number to a greater number.

8. The user input apparatus of claim 6 wherein the selected user manipulated mechanism comprises one selected from the group consisting of: at said second time a writing instrument operated by said user writes a barrier between said photon energy source and said first photon sensor to reduce photons incident thereon from a greater number to a lesser number, and at said first time a writing instrument operated by said user removes a barrier between said photon energy source and said first photon sensor to increase photons incident thereon from a lesser number to a greater number.

9. The user input apparatus of claim 6 wherein the selected user manipulated mechanism comprises one selected from the group consisting of: at said second time an object held in said user's hand reduces photon energy incident upon said first photon sensor, and at said first time an object held in said user's hand increases photon energy incident upon said first photon sensor.

10. The user input apparatus of claim 6 wherein the assigned user input meaning comprises one selected from the group consisting of: a user command, a position on said substrate, a line, a direction of motion, a character selection, and writing of an indicia.

11. A user input process comprising the steps of: providing a plurality of photon energy sensors comprising a first sensor for converting incident photons to electricity and a second sensor for converting incident photons to electricity, providing a substrate, said plurality of photon energy sensors being affixed to said substrate, providing a photon energy source, providing a user manipulated mechanism to modulate the incident quantity of photons from said photon energy source such that a greater photon quantity is incident upon said first sensor at a first time and a lesser photon quantity is incident upon said first sensor at a second time, the quantity of photons from said photon energy source incident upon said second sensor at said first time and said second time not being modulated, providing a processor for receiving a signal indicative of the modulation of said first sensor and for assigning a meaning to said modulation; wherein said user manipulated mechanism to modulate comprises one selected from the consisting of: at said second time said user covers said first photon sensor to reduce energy incident thereon from said photon energy source, at said second time said user casts a shadow upon said first photon sensor, at said second time said user prevents at least some energy from said photon energy source from being incident upon said first photon sensor, at said first time said user uncovers said first photon sensor to increase energy incident thereon from said photon energy source, at said first time said user reduces a shadow upon said first photon sensor to increase energy incident thereon from said photon energy source, and at said first time said user causes said photon energy source to be incident upon said first photon sensor.

12. The user input process of claim 11 wherein the selected user manipulated mechanism comprises one selected from the group consisting of: at said second time said user covers said first photon sensor to reduce energy incident thereon from said photon energy source, and at said first time said user uncovers said first photon sensor to increase energy incident thereon from said photon energy source.

13. The user input process of claim 11 wherein the selected user manipulated mechanism comprises one selected from the group consisting of: at said second time said user casts a shadow upon said first photon sensor, and at said first time said user reduces a shadow upon said first photon sensor to increase energy incident thereon from said photon energy source.

14. The user input process of claim 11 wherein the selected user manipulated mechanism comprises one selected from the group consisting of: at said second time said user prevents at least some energy from said photon energy source from being incident upon said first photon sensor, and at said first time said user causes at least some energy from said photon energy source to be incident upon said first photon sensor.

15. The user input process of claim 11 wherein the assigned user input meaning comprises one selected from the group consisting of: a user command, a position on said substrate, a line, a direction of motion, a character selection, and writing of an indicia.

16. A user input process comprising the steps of: providing a plurality of photon energy sensors comprising a first sensor for converting incident photons to electricity and a second sensor for converting incident photons to electricity, providing a substrate, said plurality of photon energy sensors being affixed to said substrate, providing a photon energy source, providing a user manipulated mechanism to modulate the incident quantity of photons from said photon energy source such that a greater photon quantity is incident upon said first sensor at a first time and a lesser photon quantity is incident upon said first sensor at a second time, the quantity of photons from said photon energy source incident upon said second sensor at said first time and said second time not being modulated, providing a processor for receiving a signal indicative of the modulation of said first sensor and for assigning a meaning to said modulation; wherein said user manipulated mechanism to modulate comprises one selected from the consisting of: at said second time a finger of said user is placed between said photon energy source and said first photon sensor to reduce photons incident thereon from a greater number to a lesser number, at said first time a finger of said user is removed from between said photon energy source and said first photon sensor to increase photons incident thereon from a lesser number to a greater number, at said second time a writing instrument operated by said user writes a barrier between said photon energy source and said first photon sensor to reduce photons incident thereon from a greater number to a lesser number, at said first time a writing instrument operated by said user removes a barrier between said photon energy source and said first photon sensor to increase photons incident thereon from a lesser number to a greater number, at said second time an object held in said user's hand reduces photon energy incident upon said first photon sensor, and at said first time an object held in said user's hand increases photon energy incident upon said first photon sensor.

17. The user input process of claim 16 wherein the selected user manipulated mechanism comprises one selected from the group consisting of: at said second time a finger of said user is placed between said photon energy source and said first photon sensor to reduce photons incident thereon from a greater number to a lesser number, and at said first time a finger of said user is removed from between said photon energy source and said first photon sensor to increase photons incident thereon from a lesser number to a greater number.

18. The user input process of claim 16 wherein the selected user manipulated mechanism comprises one selected from the group consisting of: at said second time a writing instrument operated by said user writes a barrier between said photon energy source and said first photon sensor to reduce photons incident thereon from a greater number to a lesser number, and at said first time a writing instrument operated by said user removes a barrier between said photon energy source and said first photon sensor to increase photons incident thereon from a lesser number to a greater number.

19. The user input process of claim 16 wherein the selected user manipulated mechanism comprises one selected from the group consisting of: at said second time an object held in said user's hand reduces photon energy incident upon said first photon sensor, and at said first time an object held in said user's hand increases photon energy incident upon said first photon sensor.

20. The user input process of claim 16 wherein the assigned user input meaning comprises one selected from the group consisting of: a user command, a position on said substrate, a line, a direction of motion, a character selection, and writing of an indicia.

* * * * *